United States Patent

Lawver

[15] 3,672,579

[45] June 27, 1972

[54] PROCESS FOR BENEFICIATING MAGNETITE IRON ORE

[72] Inventor: James E. Lawver, Edina, Minn.

[73] Assignee: The Regents of the University of Minnesota, Minneapolis, Minn.

[22] Filed: Aug. 10, 1970

[21] Appl. No.: 62,423

[52] U.S. Cl. .............................................. 241/24, 241/29
[51] Int. Cl. ........................................................... B02c 21/00
[58] Field of Search .................................. 241/24, 25, 29, 30

[56] References Cited

UNITED STATES PATENTS

| | | | |
|---|---|---|---|
| 3,022,956 | 2/1962 | Haseman | 241/29 X |
| 2,558,635 | 6/1951 | Vedensky et al. | 241/24 X |
| 2,962,231 | 11/1960 | Weston | 241/24 |
| 3,502,271 | 3/1970 | Hays | 241/29 X |

Primary Examiner—Granville Y. Custer, Jr.
Attorney—Burd, Braddock & Bartz

[57] ABSTRACT

A process for upgrading low-grade magnetite-containing iron ore with minimum fine grinding. The dry ore is first comminuted to between about three-fourths inch and 10 mesh particle size and magnetically separated. The dry tailing is discarded and the concentrate is ground to between about 20 and 100 mesh and again subjected to dry magnetic separation. The dry tailing is again discarded and the concentrate is then finely ground according to conventional practice and subjected to wet magnetic separation. About 90 percent or more of the tailing is discarded dry without fine grinding, permitting easy disposal without possible ecological damage due to lake and stream pollution.

5 Claims, 1 Drawing Figure

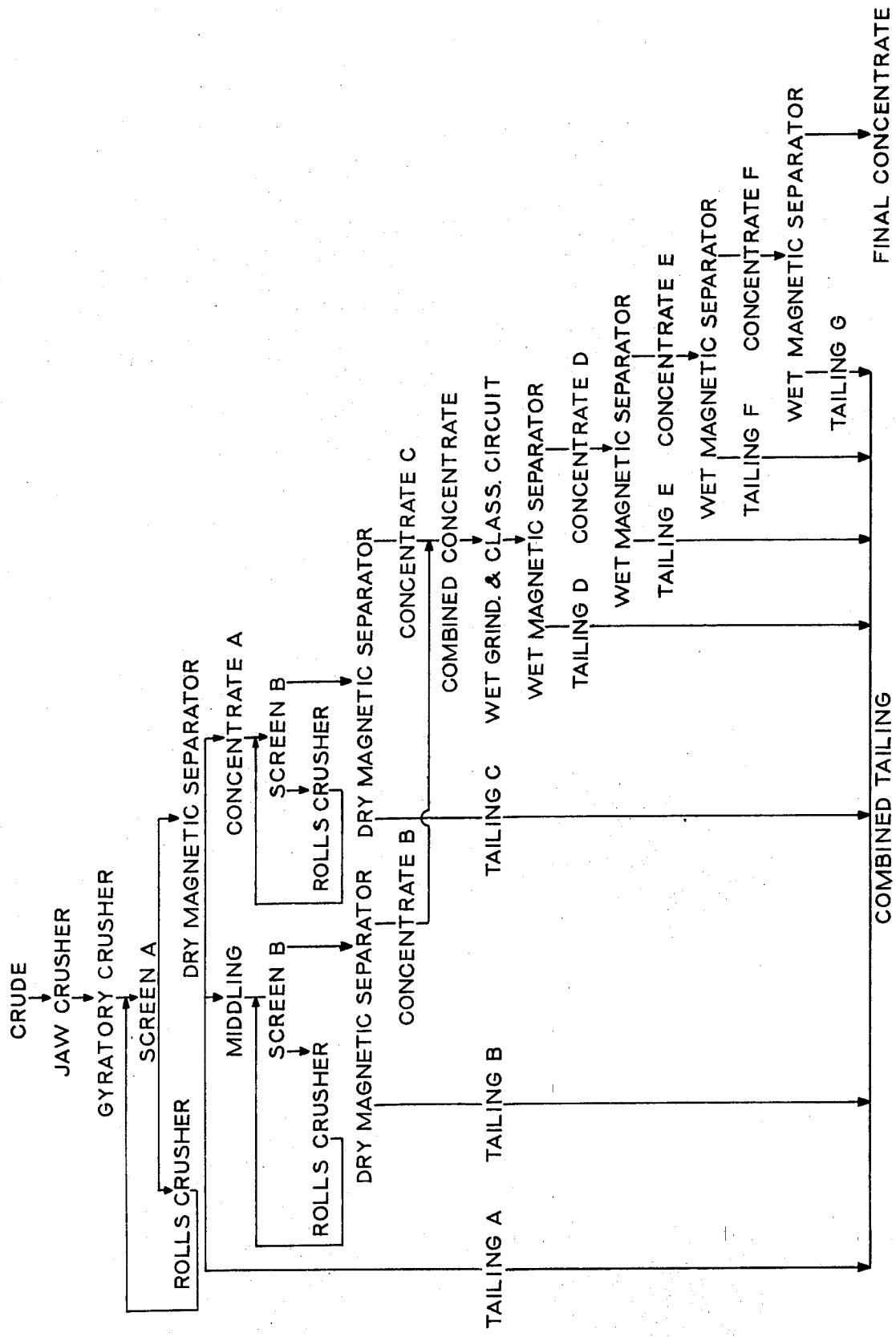

PROCESS FOR BENEFICIATING MAGNETITE IRON ORE

This invention relates to a process for the beneficiation or upgrading of low-grade magnetite-containing iron ore, such as taconite found in the eastern Mesabi Range of Minnesota, and similar ores found elsewhere. The total iron present in such ores is generally between about 25 and 35 percent. A high percentage of the iron is in the form of magnetite and a relatively small percentage exists in the form of silicates or hematite. Magnetite ($Fe_3O_4$) (molecular weight 231.55) contains 72.36 percent iron. Even if all of the iron appeared as magnetite, no more than about 34.5 to 48.4 percent of the ore would consist of magnetite. Since industrial concentration of this ore is accomplished with magnetic separators, only the iron occurring as magnetite can be recovered.

According to present beneficiation processes the ore is crushed and usually magnetically cobbed using wet cobbers but occasionally using dry cobbers. The cobbing step is carried out at a particle size range from about less than three-fourths inch to less than one-half inch. The tailings from this first magnetic separation are discarded. The cobber concentrate is then treated by a series of grinding and magnetic concentration steps that are carried out wet. The final grinding stage reduces the magnetic concentrate to a particle size that is approximately 85 percent passing 325 mesh and has a particle size distribution suitable for pelletizing. The concentrate analyzes from about 60 to 70 percent iron. In general, all of the gangue material is discarded as wet tailings. Because of their extreme fineness, and because they exist in a slurry, tailings are commonly deposited in lakes and streams. Because of this, disposal of the tailings present a serious ecological problem.

Although the ultimate environmental effect of taconite tailings is a subject of controversy, future restrictions on the disposal of tailings in lakes and streams are likely. Alternate economic methods of tailings disposal are being sought. The present invention offers a practical solution to the tailings disposal problem and at the same time results in operating economies reducing the cost of processing the ore.

The invention is illustrated in the accompanying drawing which is a schematic flow sheet of the beneficiation process.

The amount of iron in taconite ore that occurs as magnetite cannot be determined chemically and, therefore, a laboratory apparatus, the Davis magnetic tube concentrator, is used to remove all of the magnetite from a finely crushed sample. From the weight and assay of this product the magnetic iron assay of the sample can be determined. The magnetic iron assay is expressed as the percentage by weight of the sample that is iron existing in the form of magnetite. The assay may vary slightly depending upon the mesh size of the sample, minus 150 mesh and minus 270 mesh being the usual sizes at which samples are assayed.

Most magnetite iron ore is composed of some material which is fairly coarse grained and can be liberated without extremely fine grinding admixed with other material which is very fine grained and does require extremely fine grinding for liberation. According to present day practice, all of this material is finely ground to 85 percent or more minus 325 mesh.

According to the present invention, the dry crude ore composed of both coarse grained and fine grained material is first comminuted to between about three-fourths inch and 10 mesh particle size. The dry comminuted fraction is then magnetically cobbed into a low-grade concentrate and a dry tailing which is susceptible of easy disposal. The resulting low-grade concentrate is then further comminuted to a size between about 20 and 100 mesh. The resulting comminuted low-grade concentrate is then dry cobbed into two fractions, a further dry tailing and a concentrate which is processed according to the conventional commercial magnetic taconite flow sheet. However, instead of grinding all of the cobber or rougher magnetic concentrates to from 85 to 100 percent minus 325 mesh, according to the present practice, from about 60 to 65 percent of the gross weight of the crude ore (representing about 90 to 95 per cent of the total tailings) has been discarded in the form of dry tailings.

Only the 35 to 40 percent of the gross weight of the crude ore in the concentrate is then subjected to fine wet grinding and classification to about 85 percent or more minus 325 mesh and successive wet magnetic separation to produce a final concentrate of pelletizable ore of 65 percent or more iron. The small amount of wet tailings, between about 5 and 7 percent of the gross weight of the crude ore, can easily be pumped to a small tailings pond on dry land avoiding the necessity for disposal into a lake or stream.

The invention is illustrated in detail in conjunction with the illustrated flow sheet according to the following example: A magnetic taconite crude ore from the eastern Mesabi Range of Minnesota assayed 31.72 percent total iron, 25.02 percent magnetic iron derived from Davis tube tests utilizing minus 150 mesh samples and 24.74 percent magnetic iron derived from Davis tube tests utilizing minus 270 mesh samples. This crude ore was crushed in a sequence of crushing steps through a jaw crusher and gyratory crusher to between about three-fourths inch to 10 mesh and screened. All oversize material was further treated in a rolls crusher and recycled to the sizing screen A.

The sized crude ore representing 100 percent by weight was subjected to a first cobbing operation, utilizing a dry magnetic separator, from which three fractions were recovered, tailing A, a middling and concentrate A. The dry tailing A, equal to 21.87 per cent of the gross weight of the crude ore, assayed 12.66 percent total iron representing 8.44 percent iron recovery; 1.16 percent magnetic iron derived from minus 150 mesh Davis tube tests representing 0.97 percent magnetic iron recovery; and 1.15 percent magnetic iron derived from minus 270 mesh Davis tube tests representing 0.97 percent magnetic iron recovery. The middling fraction, equal to 34.43 percent of the gross weight of the crude ore, assayed 23.95 percent total iron representing 25.64 percent total iron recovery; 16.73 percent magnetic iron derived from minus 150 mesh Davis tube tests representing 22.69 percent magnetic iron recovery; and 16.18 percent magnetic iron derived from minus 270 mesh Davis tube tests representing 22.23 percent magnetic iron recovery. The dry concentrate A, equal to 43.70 percent weight recovery, assayed at 48.38 percent total iron representing 65.75 percent total iron recovery; 44.33 percent magnetic iron derived from minus 150 mesh Davis tube tests representing 76.31 percent magnetic iron recovery; and 44.01 percent magnetic iron derived from minus 270 mesh Davis tube tests representing 76.77 percent magnetic iron recovery.

The middling and concentrate A were separately sized on sizing screens B, in this instance 35 mesh screens. The oversize were subjected to a rolls crusher and recycled. The sized middling and sized concentrate A were separately subjected to dry magnetic separators.

The middling was separated into two dry fractions, tailing B and concentrate B. Tailing B, equal to 26.64 percent of the initial gross ore weight, assayed 16.55 percent total iron representing 13.43 percent total iron recovery; 8.04 percent magnetic iron derived from minus 150 mesh Davis tube tests representing 8.17 percent magnetic iron recovery; and 7.37 percent magnetic iron derived from minus 270 mesh Davis tube tests representing 7.60 percent magnetic iron recovery. Concentrate B, equal to 7.79 percent weight recovery, assayed 52.17 percent total iron representing 12.30 percent total iron recovery; 49.27 percent magnetic iron derived from minus 150 mesh Davis tube tests representing 14.56 percent magnetic iron recovery; and 48.96 percent magnetic iron derived from minus 270 mesh Davis tube tests representing 14.67 percent magnetic iron recovery.

Concentrate A was magnetically divided into two fractions, tailing C and concentrate C. Dry tailing C, equal to 13.77 percent recovery of the initial gross weight, assayed 29.89 percent total iron representing 12.54 percent total iron recovery; 22.08 percent magnetic iron derived from minus 150 mesh Davis tube tests representing 11.60 percent magnetic iron recovery; and 21.71 percent magnetic iron derived from minus 270 mesh Davis tube tests representing 11.57 percent magnetic iron recovery. Dry concentrate B, equal to 29.93 percent weight recovery, assayed 58.58 percent total iron representing 53.26 percent total iron recovery; 56.56 percent magnetic iron derived from minus 150 mesh Davis tube tests representing 64.70 percent magnetic iron recovery; and 56.15 percent magnetic iron derived from minus 270 mesh Davis tube tests representing 65.19 percent magnetic iron recovery.

Combined tailings A, B and C, equal to 62.28 percent of the initial gross weight of the ore, are dry and of coarse particle size permitting ready disposal on land. Concentrates B and C were combined for further processing. The combined concentrate, equal to 37.72 percent weight recovery, assayed 57.26 percent total iron representing 65.56 percent total iron recovery; 55.05 percent magnetic iron derived from minus 150 mesh Davis tube tests representing 79.26 percent magnetic iron recovery; and 54.67 percent magnetic iron derived from minus 270 mesh Davis tube tests representing 79.86 percent magnetic iron recovery. The combined concentrate was introduced, as in conventional commercial practice, to a wet grinding and classification circuit including ball mills and rod mills for reduction to at least 85 percent minus 325 mesh. The finely comminuted wet combined concentrate was divided in a wet magnetic separator into wet tailing D and wet concentrate D.

Tailing D, representing 5.45 percent weight recovery, assayed 12.93 percent total iron representing 2.15 percent total iron recovery; 0.06 percent magnetic iron derived from minus 150 mesh Davis tube tests representing 0.01 percent magnetic iron recovery; and 0.06 percent magnetic iron derived from minus 270 mesh Davis tube tests representing 0.01 percent magnetic iron recovery. Concentrate D, representing 32.27 percent weight recovery, assayed 65.37 percent total iron representing 63.44 percent total iron recovery; 64.77 percent magnetic iron derived from minus 150 mesh Davis tube tests representing 79.25 percent magnetic iron recovery; and 64.83 percent magnetic iron derived from minus 270 mesh Davis tube tests representing 79.85 percent magnetic iron recovery. Concentrate D was fractionated by further wet magnetic separation into wet tailing E and wet concentrate E.

Tailing E, representing 0.60 percent weight recovery, assayed 14.58 percent total iron representing 0.27 percent total iron recovery; 0.55 percent magnetic iron derived from minus 150 mesh Davis tube tests representing 0.01 percent magnetic iron recovery; and 0.55 percent magnetic iron derived from minus 270 mesh Davis tube tests representing 0.01 percent magnetic iron recovery. Concentrate E, representing 31.67 percent weight recovery, assayed 66.32 percent total iron representing 63.18 percent total iron recovery; 65.98 percent magnetic iron derived from minus 150 mesh Davis tube tests representing 79.24 percent magnetic iron recovery; and 66.04 percent magnetic iron derived from minus 270 mesh Davis tube tests representing 79.84 percent magnetic iron recovery. Concentrate E was divided by further wet magnetic separation into tailing F and concentrate F.

Tailing F, representing 0.13 percent weight recovery, assayed 15.54 percent total iron representing 0.06 percent total iron recovery; 1.91 percent magnetic iron derived from minus 150 mesh Davis tube tests representing 0.01 percent magnetic iron recovery; and 1.20 percent magnetic iron derived from minus 270 mesh Davis tube tests representing 0.01 percent magnetic iron recovery. Concentrate F, representing 31.54 percent weight recovery, assayed 66.54 percent total iron representing 63.11 percent total iron recovery; 66.24 percent magnetic iron derived from minus 150 mesh Davis tube tests representing 79.23 percent magnetic iron recovery; and 66.31 percent magnetic iron derived from minus 270 mesh Davis tube tests representing 79.83 percent magnetic iron recovery. Concentrate F was subjected to further wet magnetic separation into tailing G and a final concentrate.

Tailing G, representing 0.15 percent weight recovery, assayed 20.67 percent total iron representing 0.09 percent total iron recovery; 8.41 percent magnetic iron derived from minus 150 mesh Davis tube tests representing 0.05 percent magnetic iron recovery; and 8.83 percent magnetic iron derived from minus 270 mesh Davis tube tests representing 0.05 percent magnetic iron recovery. The final concentrate, equal to 31.39 percent weight recovery, assayed 66.76 percent total iron representing 63.92 percent total iron recovery; 66.53 percent magnetic iron derived from minus 150 mesh Davis tube tests representing 79.18 percent magnetic iron recovery; and 66.59 per cent magnetic iron derived from minus 270 mesh Davis tube tests representing 79.78 percent magnetic iron recovery. The final concentrate compared favorably both in assay and recovery with the product of commercial taconite beneficiation plants. The ore was ready for pelletizing and shipment.

The total combined tailing, equal to 68.61 percent weight recovery, assayed 17.69 percent total iron representing 36.98 percent total iron recovery; 7.95 percent magnetic iron derived from minus 150 mesh Davis tube tests representing 20.82 percent magnetic iron recovery; and 7.62 percent magnetic iron derived from minus 270 mesh Davis tube tests representing 20.22 percent magnetic iron recovery. Of the combined tailing representing 68.61 percent weight recovery, 90.77 percent was produced dry and was readily disposable while only 9.23 percent was produced wet requiring pumping to a tailings dam.

For easy comparison, the results are tabulated below:

| Fraction | Percent wt. recovery | Total iron Assay | Total iron Percent wt. recovery | −150 mesh Assay | −150 mesh Percent wt. recovery | −270 mesh Assay | −270 mesh Percent wt. recovery |
|---|---|---|---|---|---|---|---|
| Crude ore | 100 | 31.72 | 100 | 25.02 | 100 | 24.74 | 100 |
| Tailing A | 21.87 | 12.66 | 8.44 | 1.16 | 0.97 | 1.15 | 0.97 |
| Middling | 34.43 | 23.95 | 25.64 | 16.73 | 22.69 | 16.18 | 22.23 |
| Concentrate A | 43.70 | 48.38 | 65.75 | 44.33 | 76.31 | 44.01 | 76.77 |
| Tailing B | 26.64 | 16.55 | 13.43 | 8.04 | 8.17 | 7.37 | 7.60 |
| Concentrate B | 7.79 | 52.17 | 12.30 | 49.27 | 14.56 | 48.98 | 14.67 |
| Tailing C | 13.77 | 29.89 | 12.54 | 22.08 | 11.60 | 21.71 | 11.57 |
| Concentrate C | 29.93 | 58.58 | 53.26 | 56.56 | 64.70 | 56.15 | 65.19 |
| Combined concentrate | 37.72 | 57.26 | 65.56 | 55.05 | 79.26 | 54.67 | 79.86 |
| Tailing D | 5.45 | 12.93 | 2.15 | 0.06 | 0.01 | 0.06 | 0.01 |
| Concentrate D | 32.27 | 65.37 | 63.44 | 64.77 | 79.25 | 64.83 | 79.85 |
| Tailing E | 0.60 | 14.58 | 0.27 | 0.55 | 0.01 | 0.55 | 0.01 |
| Concentrate E | 31.67 | 66.32 | 63.18 | 65.98 | 79.24 | 66.04 | 79.84 |
| Tailing F | 0.13 | 15.54 | 0.06 | 1.91 | 0.01 | 1.20 | 0.01 |
| Concentrate F | 31.54 | 66.54 | 63.11 | 66.24 | 79.23 | 66.31 | 79.83 |
| Tailing G | 0.15 | 20.67 | 0.09 | 8.41 | 0.05 | 8.83 | 0.05 |
| Combined tailing | 68.61 | 17.69 | 36.98 | 7.95 | 20.82 | 7.62 | 20.22 |
| Final concentrate | 31.39 | 66.76 | 63.02 | 66.53 | 79.18 | 66.59 | 79.78 |

The example is intended to be illustrative only. Since iron ore is a product of nature, wide variations exist from sample to sample. Other tests on other samples have produced comparable results.

The procedures of this invention utilizing dry and wet circuits permit considerable economic savings in both equipment and operation. Not only are savings achieved in the grinding circuit, but a higher grade concentrate can be produced. The supposed pollution problem from disposal of tailings in lakes and streams can be eliminated. Even if the small amount of wet tailings are dumped into water, particles of colloidal size, which may contribute to pollution, are largely eliminated.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A process for beneficiating low-grade magnetite iron ore containing no more than about 34.5 to 48.4 percent magnetite to facilitate on-land disposal of tailings, which process comprises:
    A. crushing the crude ore to between about three-fourths inch and 10 mesh particle size to liberate coarse grained magnetite,
    B. subjecting the crushed crude ore to a first dry magnetic separation to produce an initial dry tailing and an initial concentrate,
    C. discarding said initial dry tailing,
    D. further crushing said initial concentrate to between about 20 and 100 mesh particle size to liberate finer grain magnetite,
    E. subjecting said further crushed initial concentrate to a further dry magnetic separation to produce a further dry tailing and intermediate concentrate,
    F. discarding said further dry tailing,
    G. finely grinding said intermediate concentrate to less than about 85 percent minus 325 mesh particle size to liberate fine grain magnetite,
    H. subjecting the finely ground concentrate to wet magnetic separation to produce a pelletizable high grade final concentrate and a final wet tailing, and
    I. discarding said last named wet tailing.

2. A process according to claim 1 further characterized in that:
    A. said initial concentrate resulting from said first dry magnetic separation is composed of a plurality of fractions,
    B. said concentrate fractions are separately further crushed and subjected to further dry magnetic separation, and
    C. the resulting further intermediate concentrate fractions are combined for further processing.

3. A process according to claim 1 further characterized in that:
    A. said finely ground concentrate is subjected sequentially to a plurality of wet magnetic separations each producing a tailing and a further upgraded concentrate,
    B. each of said tailings is discarded, and
    C. said final high-grade concentrate is recovered.

4. A process according to claim 1 further characterized in that said low-grade magnetite iron ore is taconite.

5. A process according to claim 1 further characterized in that said last named wet tailing is pumped to a dry land tailing pond.

* * * * *

PO-1050
(5/69)

UNITED STATES PATENT OFFICE
CERTIFICATE OF CORRECTION

Patent No. 3,672,579　　　　　　　　　Dated　June 27, 1972

Inventor(s)　James E. Lawver

It is certified that error appears in the above-identified patent and that said Letters Patent are hereby corrected as shown below:

Column 4, line 31, "63.92" should be --63.02--.

Signed and sealed this 28th day of November 1972.

(SEAL)
Attest:

EDWARD M. FLETCHER, JR.　　　　　　　　ROBERT GOTTSCHALK
Attesting Officer　　　　　　　　　　　Commissioner of Patents